Jan. 1, 1935.  J. O. HEINZE  1,986,435
TURBINE ENGINE
Filed July 18, 1932   3 Sheets-Sheet 1
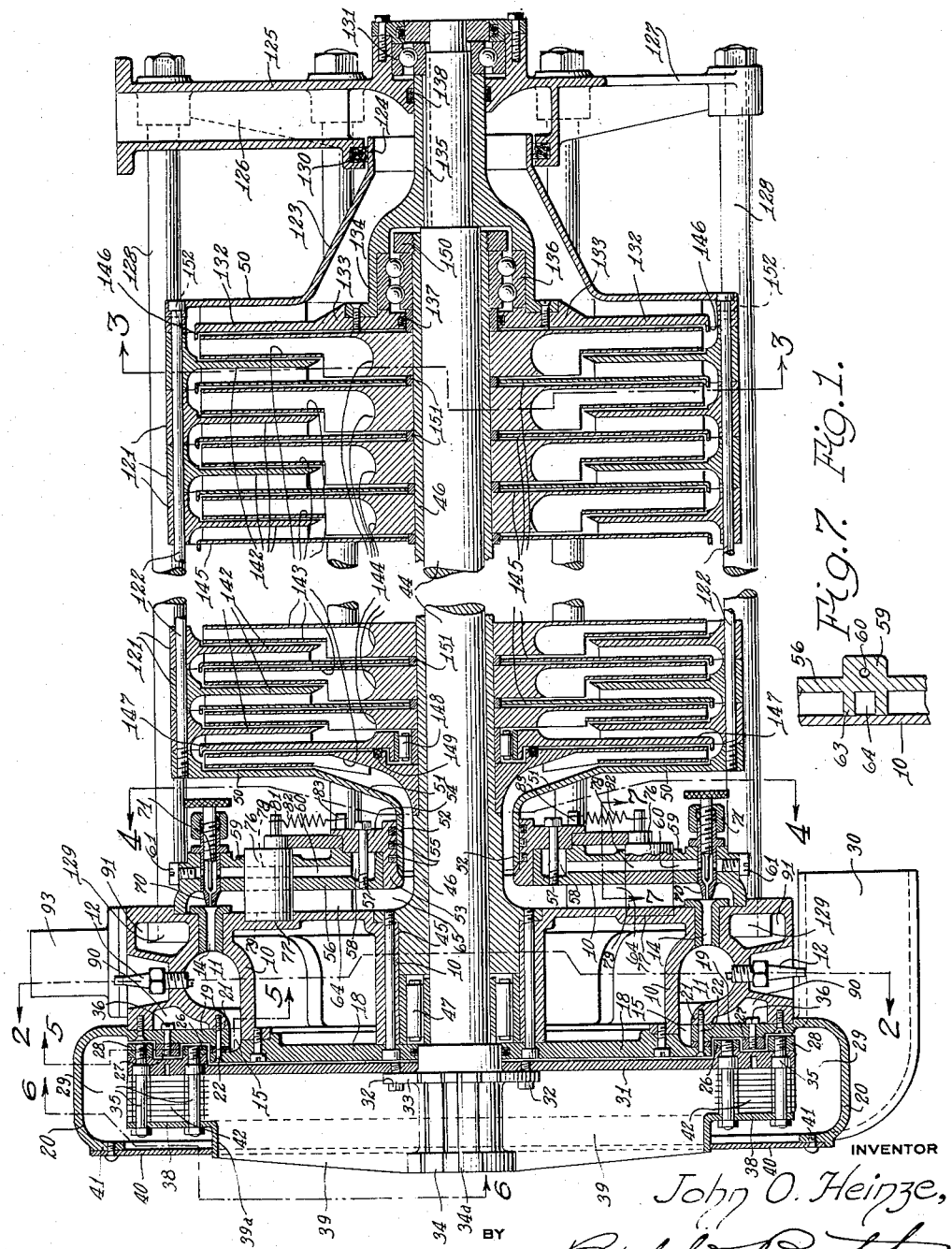
INVENTOR
John O. Heinze,
BY
ATTORNEYS

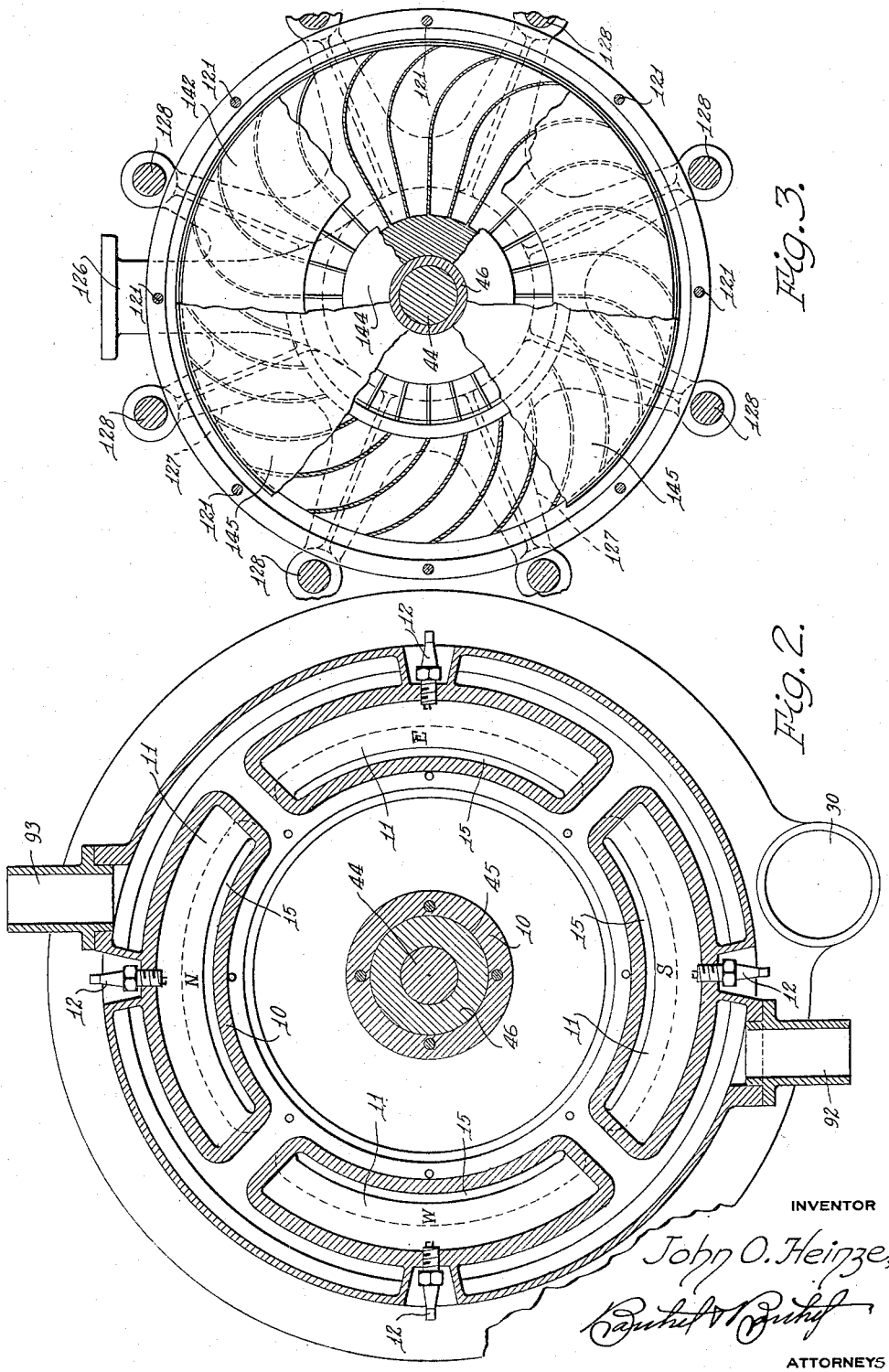

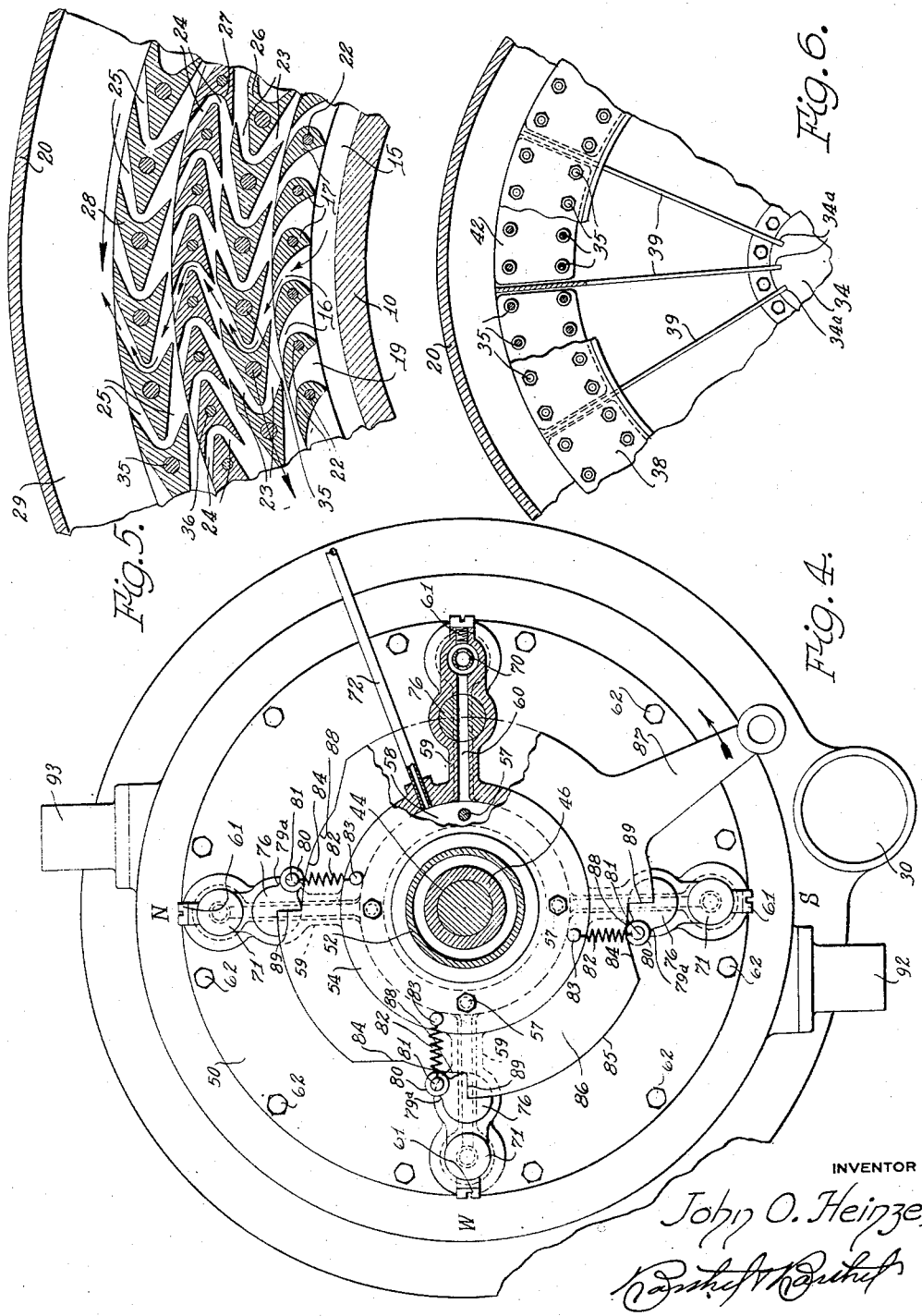

Patented Jan. 1, 1935

1,986,435

UNITED STATES PATENT OFFICE 1,986,435

TURBINE ENGINE

John O. Heinze, Detroit, Mich., assignor to Heinze Development Company, a corporation of Michigan Application July 18, 1932, Serial No. 623,150

9 Claims. (Cl. 60—41)

This invention relates to turbine engines.

The principal object of the invention is to provide a turbine engine having means for cooling parts which might otherwise be injured by the high temperature exhaust gases, the engine further having a combustion chamber whose effective combustion volume may be varied to vary the engine output, the engine further having a novel form of air pump driven by the engine itself.

Another object is to provide a turbine engine having a plurality of independent combustion chambers, one or more of which may be placed in operation, to vary the engine output, it being understood that the engine output is proportional to the number of cylinders placed in operation.

A further object is to provide a turbine engine having an air pump associated therewith, the pump serving to force air for combustion to the engine, and also serving to aid the flow of fuel to the engine, the pump being driven by and so associated with the engine as to form a unitary combination structure.

A further object is to provide a novel means for cooling these parts of a turbine engine normally exposed to high temperatures.

Still further objects are to provide novel details of construction of turbine engines, air pumps, etc.

Still further objects of the invention will readily appear from the following detailed description of an embodiment and from the appended drawings showing the same.

In the drawings,

Figure 1 shows the device in elevational section;

Figs. 2–7 are sections as if on lines 2—2, to 7—7, of Fig. 1.

The device includes a turbine-engine and an air pump for the same, and these will now be described.

The turbine engine

Referring to the drawings and more particularly to Figs. 1 and 2, it will be seen that there is provided an annular stationary turbine casting 10 formed with a plurality of arcuate shaped combustion chambers 11 each of which is arranged to be fired independently, for starting only, by a spark plug 12, the fuel inlet for each of these chambers being referenced 14. In the embodiment shown there are four chambers, E, S, W and N, and therefore four inlets 14. The exhaust gases escape from the combustion chambers through arcuate slots 15 and first pass through the nozzle spaces 16 (Fig. 5) disposed between the stationary elements 17 secured between the header plate 18, and the flange 19 of the exhaust manifold casing 20. The latter flange and the annular row of elements 17 are between the header plate and an annular edge 21 of the turbine casting, and all of these parts are fixedly secured, in assembly, by the annular row of bolts 22. The gases then pass through the staggered radial spaces 23, 24 and 25 between the sets of buckets 26, 27 and 28, and finally pass into the annular interior 29 of the exhaust manifold from where they escape through the exhaust tail pipe 30.

The buckets 26 and 28 are arranged in concentric rows on concentric ledges of an outside plate 31 secured by bolts 32 to the flange 33 of an axial collar 34, and are secured to plate 31 by copper bolts 35. Buckets 27 are between buckets 26 and 28 and are secured to the flange 19 of the exhaust manifold casting 30 by bolts 36, as shown.

The collar 34 is connected to the annular plate 38, through which bolts 35 are passed, by radial, fin-like ribs 39, (Fig. 6) having ends disposed in slots 34a of collar 34, these parts thus being secured to and carried by the outside plate 31, as shown. The flange 39a of plate 38 projects axially through a large hole formed in the plate 40 bolted to the inwardly directed flange 41 of the exhaust manifold casting, and the spaces between fins 39 are open to the atmosphere and also to the interior 29 of the exhaust manifold. The bolts 35 are surrounded by relatively spaced thin fins 42 arranged in annular rows, as shown.

The collar 34 is integral with and is turned on a shaft 44 which projects through the center hole 45 of the annular turbine casting 10 and a long sleeve 46, bolted to casting 10 surrounds and is clear of shaft 44, there also being a bearing 47 between the shaft and casting 10.

Surrounding the sleeve 46 and shaft 44 is the rotor shell 50 of the air pump whose construction will later be described. The rotor shell has a frusto conical end 51 terminating in a cylindrical flange 52 spaced from sleeve 46 and fitted into a ring like casting 53 having a flange 54, there being sealing rings 55 between the flange 52 and casting 53. An intake manifold casting 56 is bolted to casting 53 by bolts 57 and is formed to define an annular space 58, and radial hollow arms 59 (Fig. 4) projecting outwardly therefrom, the ends of the bores 60 through arms 59 being closed by screw plugs 61. The casting 56 is bolted to the turbine casting 10 by bolts 62 (Fig. 4) and is spaced therefrom by arcuately connected radial ribs 63 having radial passages 64 (Fig. 7) therethrough connecting the space 65 into which rotor flange 52 discharges, with the inlet nipples or bushings 14.

Fuel nozzles 70 are passed through radial arms 59 and radial ribs 63 of the intake casting 56 and have adjusting valves 71, as shown, for adjusting the flow of fuel from the intake manifold space 58, through bores 60, and nozzles 70, to inlet nipples 14 and into the combustion chambers 11. Fuel is introduced into the manifold space 58 through a fuel pipe 72, connected to casting 56 and opening into space 58.

For controlling the flow of fuel through bores 60 and the flow of air through passages 64, plug valves 76 are passed through arms 59 and ribs 63, these being journalled in spots or recesses 77 of turbine casting 10. The valves have orifices 78 and 79 therethrough, adapted to align with bores 60 and passages 69, to permit flow through these bores and passages. In the embodiment shown there are four such valves, for the four combustion chambers.

The valves 76 are provided with small radial extensions 79a having cylindrical surfaces 80 and also having pins 81 connected to ends of a coiled tension spring 82, these having their other ends connected to pins 83 on the flange 54 of the stationary casting 53, the springs constantly tending to rotate the plug valves in such a manner that the cylindrical surfaces 80 of their radial extensions 79a are in constant engagement with the camming surfaces of notches 84 cut from the periphery 85 of a camming ring 86, the latter surrounding and being journalled on the flange 54 of casting 53, and having a radial operating arm 87.

There are only three of the notches 84, as shown (Fig. 4) there being no E notch, and their camming surfaces are all differently formed. The camming surface 88 of the S notch 84, starting from shoulder 89 warps outwardly, so that if ring 86 is rotated counterclockwise a few degrees from its starting point, S valve 76 will be closed. The camming surface of the W notch 84, starting from shoulder 89, is first concentric with flange 54 for a few degrees, and then warps outwardly, the construction being such that the initial counterclockwise rotation of ring 86, while it closes S valve 76, will not tend to close the W valve 76, at that time. Further rotation of ring 86 will tend to close the valve 76, such action taking place only when the S valve is fully closed, and when the outwardly warping camming surface 88 of the notch 84 reaches valve 76. The N notch camming surface 88 has an even longer concentric part, and then an outwardly warping part, so that both the S and the W valves must be closed, in the order named, before the valve is closed.

The E valve 76 does not have a radial extension 79a etc., and is clear of ring 86. This valve is intended to be open at all times, except when it is desired to cut off the supply of air and fuel to the E chamber, in which case this valve may be closed by any suitable means not shown.

The selectivity of the valve gear permits, (1) all four chambers E, S, W and N, to be in operation, (2) only chambers E, W and N to be in operation, (3) only chambers E and N to be in operation, or (4) only chamber E to be in operation.

The turbine casting 10 is formed to provide water jacket spaces 90 and 91, having a cooling water inlet 92 and an outlet 93.

It will be observed at this time that the four combustion chambers are independent of each other and independently valved. Accordingly, one or more of them may be placed in operation, as desired to vary the engine output, it being understood that the output is proportionate to the number of combustion chambers in operation.

It will further be observed that all of the parts exposed to the hot gases are effectively cooled, both by the cooling water in jacket spaces 90 and 91, and by the fins 39, and the cooling air forced through these fins against the outside plate 31, and through the fins 42 and bolts 35.

Further, the construction of the engine is such that it is well balanced and compact, and further, it effectively journals and supports the rotating shaft 44.

*The air pump*

The shell 50 of the air pump, previously referred to in connection with the air intake for the turbo engine, is made up of a series of annular sections 121 bolted to one another by long bolts 122. The section at the left end (Fig. 1) has the frusto-conical end 51 terminating in the cylindrical flange 52. The section at the right end has a frusto-conical end 123 terminating in a cylindrical flange 124 sealed to the annular edge of an air intake casting 125, the latter having a radial air intake pipe 126 (Fig. 3) and also having radial webs 127 having perforated holes through which pass long bolts 128 connecting casting 125 with the turbine casting 10, the latter having bosses 129 receiving the ends of the bolts.

The rotor shell is sealed to castings 53 and 125, by seals 55 and 130. The casting 125 also has a bearing 131 for the end of shaft 44.

The right end section 121 of shell 50 has inwardly projecting radial vanes or buckets 132 connected by an integral ring 133. A collar 134 is bolted to ring 133, and fits on and is keyed to shaft 44 by a key 135, the collar also being provided with a bearing 136 journalling it on the stationary sleeve 46 previously mentioned. The ring 133 is sealed to sleeve 46 by a sealing ring 137, and collar 134 is sealed to casting 125 by a sealing ring 138, as shown.

The intermediate sections 121 of rotor 50 also have inwardly projecting radial vanes or buckets, referenced 142, and there are no vanes or buckets formed on the left end section 121. The vanes 132, 142 are longitudinally spaced, and interfitted between them are the radially outwardly projecting vanes or buckets 143 of the stator sections 144 supported on and spaced along the sleeve 46. Between the rotor vanes 142 and the stator vanes 143 are the air directing and baffling plates 145. The vanes 132 of the right end rotor section are continued outwardly and are directed to the left, as at 146, to provide air directing and baffling means for the right end of the rotor.

The rotor section 121 next to the left end rotor section is formed with an air directing and baffling plate 147 integral with the vanes or buckets 142 thereof and this plate is journalled on the sleeve 46 through a bearing 148 and is sealed from the left end stator section 144 by a sealing ring 149. This construction provides a bearing for the left end of the rotor, the right end of the same being journaled on sleeve 46 through bearing 136.

Threaded on the right end of sleeve 46 is a large nut 150 which, when tightened up, fixes and spaces all the stator parts on the sleeve 46, there being spacing or take-up rings 151 between the various stator sections, as shown.

The right end rotor section comprises the bucket member 132 which is secured in spaced relation to the end wall 50 of the shell to form an air passage 152 therebetween communicating with an annular space between the ring 133 and collar 34, and the frusto-conical wall 123 of the shell to provide an air inlet passage, the outer end of which opens into the air intake 125 between the flange 124 and the extended end of the hub 134.

The air flow in the pump is as follows; air enters through pipe 126 and is directed into the rotor shell, around the hub 134 and inside the frusto-conical part 123. The air first flows radially outwardly through the passage 152 and then is caused to change its direction several times as it passes between the vanes or buckets of the several rotors and stators. The air leaves the air pump or blower through the space between the flange 52 of the left end stator section and the member 46 into the air manifold space between the castings 56, and the turbine casting 10, from which it passes through one or more of the valved passages 64 to one or more of the inlets 14 and the combustion chambers 11. As the air passes the nozzles 70 adjacent inlets 14, it causes an adjusted flow of fuel into the adjacent combustion chamber.

What I claim is:

1. A turbine engine comprising an annular stationary casing having a plurality of independent, arcuate, circumferentially spaced combustion chambers, means for supplying air under pressure, a common fuel supply means for said chambers, hollow inlet arms extending from said means respectively to said chambers, and air passages communicating with said air supplying means and extending to said chambers, a valve in each arm controlling flow therethrough and through said air passages, a rotatably mounted cam plate having cam parts respectively cooperating with said valves and adapted to operate said valves progressively, one after another by rotative movement of said plate.

2. A turbine engine comprising an annular stationary casing having a combustion chamber, a shaft journalled axially in said casing, a turbine stator fixed to said casing side, a cooperating rotor secured to said shaft in opposed relation to said side of said casing, said chamber having an outlet adapted to deliver combustible mixture under pressure to said stator and rotor, an annular exhaust manifold secured to said casing and spaced from the periphery of said rotor and outer side thereof and enclosing said stator and rotor, and fins on said rotor within said manifold.

3. A turbine engine comprising an annular stationary casing having a combustion chamber therein, a shaft journalled axially in said casing, a turbine stator fixed to said casing side, a cooperating rotor secured to said shaft in opposed relation to said stator, said chamber having an outlet adapted to deliver combustible mixture under pressure to said stator and rotor, an exhaust manifold secured to said casing and extended over and spaced from the periphery of said rotor, means projecting laterally from said rotor within the peripheral portion of said manifold, a series of spaced apart cooling fins carried by said means, and means carried by said shaft for directing air into said manifold between said fins.

4. A turbine engine comprising an annular casing having an arcuate combustion chamber, a shaft journalled axially in said casing, a turbine stator fixed to an end face of said casing and having buckets adjacent its periphery, a turbine rotor secured to said shaft and provided with buckets adjacent its periphery, an annular exhaust manifold secured to said casing and enclosing the peripheral portion of said rotor and stator and spaced therefrom, said combustion chamber having an outlet to deliver gas under pressure to said stator and rotor, an annular series of spaced apart cooling fins carried by said rotor adjacent the buckets thereof within said manifold, said manifold having an open side opposite the outer side of said rotor, and fin ribs carried by said shaft opposite said open side of said manifold and extending radially outward to adjacent said fins for forcing cooling air through said open side of said manifold and directing said air outwardly to and between said fins and into said peripheral portion of said manifold.

5. A turbine engine comprising a fixed casing, a combustion chamber within said casing spaced from the walls thereof and having an outlet passage opening through a wall of said casing, a turbine stator secured to said wall of said casing, and a cooperating turbine rotor adjacent said stator, said passage being arranged to direct gases of combustion under high pressure into contact with said rotor and stator, and said casing being arranged for the circulation of a cooling fluid therein around said combustion chamber and its outlet passage, and in contact with said wall of said casing to cool the same and said rotor and stator.

6. A turbine engine comprising a fixed annular casing having an inlet and an outlet for the circulation of a cooling fluid therein, an arcuate combustion chamber in said casing spaced from the walls thereof and having outlet passages opening through a side wall of said casing, a turbine stator of annular form secured to the exterior of the said wall of said casing, a turbine rotor of disk form adjacent said stator and wall, said outlet passages being arranged to direct gases of combustion under high pressure into contact with said rotor and stator, and means for causing a flow of air radially of said rotor disk to cool the same.

7. A turbine engine comprising a fixed annular casing having an inlet and an outlet for the circulation of a cooling fluid therein, an arcuate combustion chamber in said casing spaced from the walls thereof and having a neck portion formed with an outlet passage opening through a side wall of said casing, a turbine stator comprising buckets secured to said side wall of said casing, a turbine rotor comprising a disk adjacent said wall and having buckets adjacent its periphery to cooperate with said buckets of said stator, an annular exhaust manifold over the periphery of said rotor, and cooling fins on said rotor disk adjacent its periphery.

8. A turbine engine comprising a fixed annular casing having an inlet and an outlet for the circulation of a cooling fluid through said casing, an arcuate combustion chamber within said casing spaced from the walls thereof and having a neck portion formed with an outlet passage opening through a side wall of said casing, means for supplying a combustible mixture under pressure to said combustion chamber, a stator comprising buckets secured to said side wall of said casing adjacent the outlet of said passage leading from said combustion chamber, a rotor comprising a disk adjacent said wall and having buckets adjacent its periphery to cooperate with said buckets of said stator, a shaft mounted axially of said casing and to which said disk of said rotor is secured, an annular exhaust muffler having a peripheral wall spaced from the periphery of said rotor disk and having a side wall extending inwardly in spaced relation to the outer side of said rotor disk, fins on said rotor disk to force air radially outward over the outer side of said rotor disk and into said manifold, an air chamber at the side of said casing opposite that at which said rotor disk is positioned, said air chamber being in communication with said means for supplying combustible mixture to said combustion chamber, and means for supplying air under pressure to said air chamber.

9. A turbine engine comprising an annular stationary casing having a combustion chamber, a shaft journalled axially in said casing, a turbine stator fixed to said casing side, a co-operating rotor secured to said shaft in opposed relation to said side of said casing, said chamber having an outlet adapted to direct gases of combustion under high pressure to said stator and rotor, an annular exhaust manifold secured to said casing and extending over the periphery of said rotor, and cooling means on said rotor adjacent its periphery.

JOHN O. HEINZE.